(12) United States Patent
Xue et al.

(10) Patent No.: US 11,286,381 B2
(45) Date of Patent: Mar. 29, 2022

(54) FORMALDEHYDE-FREE CURABLE COMPOSITION

(71) Applicant: Rohm and Haas Company, Collegeville, PA (US)

(72) Inventors: Yin Xue, Shanghai (CN); Zhaohui Qu, Shanghai (CN)

(73) Assignee: Rohm and Haas Company, Collegeville, PA (US)

(*) Notice: Subject to any disclaimer, the term of this patent is extended or adjusted under 35 U.S.C. 154(b) by 301 days.

(21) Appl. No.: 16/482,989

(22) PCT Filed: Mar. 30, 2017

(86) PCT No.: PCT/CN2017/078707
§ 371 (c)(1),
(2) Date: Aug. 1, 2019

(87) PCT Pub. No.: WO2018/176298
PCT Pub. Date: Oct. 4, 2018

(65) Prior Publication Data
US 2021/0277217 A1    Sep. 9, 2021

(51) Int. Cl.
*C08L 25/14* (2006.01)
*C09D 125/14* (2006.01)

(52) U.S. Cl.
CPC .......... *C08L 25/14* (2013.01); *C09D 125/14* (2013.01); *C08L 2201/54* (2013.01)

(58) Field of Classification Search
CPC .... C08L 25/14; C08L 2201/54; C09D 125/14
USPC ........................................................ 524/501
See application file for complete search history.

(56) References Cited

U.S. PATENT DOCUMENTS

| 4,325,856 A | 4/1982 | Ishikawa et al. |
| 4,654,397 A | 3/1987 | Mueller-Mall et al. |
| 4,814,373 A | 3/1989 | Frankel et al. |
| 8,173,744 B2 | 5/2012 | Ishikura et al. |
| 8,299,153 B2 | 10/2012 | Kelly |
| 8,530,608 B2 | 9/2013 | McGee et al. |
| 2015/0147502 A1* | 5/2015 | Lindenmuth ........ C09D 123/12 428/35.7 |

FOREIGN PATENT DOCUMENTS

| CN | 105060736 | 11/2015 |
| CN | 105131874 | 12/2015 |
| WO | 2012068576 | 5/2012 |
| WO | 2014127093 | 8/2014 |

OTHER PUBLICATIONS

PCT/CN2017/078707, International Search Report and Written Opinion with a dated Jan. 5, 2018.
PCT/CN2017/078707, International Preliminary Report on Patentability with a dated Oct. 1, 2019.

* cited by examiner

*Primary Examiner* — Hui H Chin
(74) *Attorney, Agent, or Firm* — William Hales

(57) ABSTRACT

The present disclosure provides a curable composition comprising from 70 to 99% by dry weight based on total dry weight of the curable composition, an acrylic emulsion component, and from 1 to 30% by dry weight based on the total dry weight of the curable composition, a polyolefin emulsion component prepared by emulsifying a polycarboxylic-compound functionalized polyolefin starting material.

10 Claims, No Drawings

FORMALDEHYDE-FREE CURABLE COMPOSITION

FIELD OF THE DISCLOSURE

The present disclosure relates to a curable aqueous composition, a method for forming a treated substrate with the curable aqueous composition, and the substrate so treated are provided. The curable aqueous composition, the process for forming a treated substrate and the treated substrate may be free from formaldehyde.

INTRODUCTION

Formaldehyde-based resins, e.g. Phenol-Formaldehyde (PF), Melamine-Formaldehyde (MF), Urea-Formaldehyde (UF) resins are widely used as nonwovens binder for various industrial applications such as fiberglass insulation industry, paper impregnation, filtration media, and roofing materials. These formaldehyde-based resins are inexpensive, have low viscosity, and are able to cure to form a rigid polymer, thereby providing the finished product with excellent physical properties.

A serious disadvantage of PF, MF and UF resins is high concentration of free formaldehyde, which is undesirable for ecological reasons. During the curing reaction, formaldehyde is volatilized from the binder into the surrounding environment. Although addition of urea to PF resins results in decreasing formaldehyde emissions, at the same time, ammonia emissions and "blue smoke" increase dramatically.

Therefore, there is a continuing need for formaldehyde-free curable compositions.

SUMMARY OF THE DISCLOSURE

The present disclosure provides a curable composition comprising from 70 to 99% by dry weight based on total dry weight of the curable composition, an acrylic emulsion component, and from 1 to 30% by dry weight based on the total dry weight of the curable composition, a polyolefin emulsion component prepared by emulsifying a polycarboxylic-compound functionalized polyolefin starting material.

The present invention further provided a method for forming a substrate comprising: a) forming a curable aqueous composition comprising from 70 to 99% by dry weight based on total dry weight of the curable composition, an acrylic emulsion component, and from 1 to 30% by dry weight based on the total dry weight of the curable composition, a polyolefin emulsion component prepared by emulsifying a polycarboxylic-compound functionalized polyolefin starting material; b) contacting a flexible substrate with said curable aqueous composition; and c) heating said curable aqueous composition at a temperature of from 120° C. to 220° C.

In a third aspect of the present invention, there is provided a treated substrate formed by the method of the second aspect of the present invention.

DETAILED DESCRIPTION OF THE DISCLOSURE

For the purpose of describing the components in the compositions of this disclosure, all phrases comprising parenthesis denote either or both of the included parenthetical matter and its absence. For example, the phrase "(co)polymer" includes polymer, copolymer and mixtures thereof; and the phrase "(meth)acrylate" means acrylate, methacrylate, and mixtures thereof.

The curable composition comprises from 70 to 99%, for example from 75% to 95%, or in the alternative from 80% to 92% by dry weight based on the total dry weight of the curable composition, an acrylic emulsion component, and from 1 to 30%, for example from 5% to 25%, or in the alternative from 8% to 25% by dry weight based on the total dry weight of the curable composition, a polyolefin emulsion component prepared by emulsifying a polycarboxylic-compound functionalized polyolefin starting material.

The Acrylic Emulsion Component

The acrylic emulsion component comprises from 20 to 70%, for example from 40 to 60%, or in the alternative from 45 to 60%, by weight of acrylic solids, based on the total weight of the acrylic emulsion. The acrylic solids present in the acrylic emulsion have an average weight particle size diameter in the range of from 75 to 450 nm, for example, from 115 to 375 nm, or in the alternative from 150 to 300 nm. The acrylic polymer present in the acrylic emulsion component has an acid level in the range of from 0.25 to 10, for example from 0.25 to 5, or in the alternative from 0.5 to 5 percent by weight of acid monomers based on the total weight of the acrylic monomers. The acrylic polymer present in the acrylic emulsion component has a weight average molecular weight in the range of from 100,000 to 5,000,000 g/mole, for example from 200,000 to 1,000,000 g/mole, or in the alternative from 200,000 to 750,000 g/mole. The acrylic polymer present in the acrylic emulsion component has a glass transition temperature (Tg) in the range of from −40 to 100° C., for example from 0 to 100° C., or in the alternative from 10 to 80° C., or in the alternative from 20 to 65° C. The acrylic emulsion component of the present disclosure has a pH in the range of from 6 to 10, for example from 7 to 9.

In a different embodiment of the disclosure, the acrylic emulsion component may contain from 0.25 to 10%, for example from 0.25 to 5%, or in the alternative from 0.5 to 5% by weight based on the total weight of the acrylic monomers, copolymerized ethylenically unsaturated carboxylic acid monomer, such as, for example, acrylic acid, methacrylic acid, crotonic acid, itaconic acid, fumaric acid, maleic acid, monomethyl itaconate, monomethyl fumarate, monobutyl fumarate, and maleic anhydride.

Suitable mono-ethylenically unsaturated acid or diacid monomers may include, for example, (meth)acrylic acid, itaconic acid, monomethyl itaconate, (meth)acryloxypropionic acid, aconitic acid, fumaric acid, crotonic acid, maleic acid, anhydrides thereof, e.g. maleic anhydride; monomethyl maleate; monoalkyl itaconates; monoalkyl fumarates, e.g. monomethyl fumarate; 2-acrylamido-2-methylpropane sulfonic acid; vinyl sulfonic acid; styrene sulfonic acid; 1-allyloxy-2-hydroxypropane sulfonic acid; alkyl allyl sulfosuccinic acid; sulfoethyl (meth)acrylate; phosphoalkyl (meth)acrylates, such as phosphoethyl (meth)acrylate; phosphodialkyl (meth)acrylates; and allyl phosphate. In some embodiments, the acid monomers are (meth)acrylic acid, itaconic acid, fumaric acid and maleic acid.

In another embodiment of the disclosure, the acrylic emulsion component includes, in addition to ethylenically unsaturated carboxylic acid monomer, at least one other copolymerized ethylenically unsaturated monomer such as, for example, a (meth)acrylic ester monomer including methyl (meth)acrylate, ethyl (meth)acrylate, butyl (meth)acrylate, 2-ethylhexyl (meth)acrylate, decyl (meth)acrylate, hydroxyethyl (meth)acrylate, hydroxypropyl (meth)acrylate, ureido-functional (meth)acrylates and acetoacetates, acetamides or cyanoacetates of (meth)acrylic acid; styrene or substituted styrenes; vinyl toluene; butadiene; vinyl acetate or other vinyl esters; vinyl monomers such as vinyl chloride, vinylidene chloride, N-vinyl pyrollidone; and (meth)acrylonitrile The use of the term "(meth)" followed by another term such as (meth)acrylate or (meth)acrylamide, as used throughout the disclosure, refers to both acrylates and methacrylates or acrylamides and methacrylamides, respectively. Preferably, monomers which may generate formaldehyde on polymerization or during subsequent processing such as, for example, N-alkylol (meth)acrylamide are excluded.

In yet another embodiment of the disclosure, the acrylic emulsion component may contain from 0 to 5% by weight based on the total weight of the acrylic monomers, copolymerized multi-ethylenically unsaturated monomers such as, for example, allyl methacrylate, diallyl phthalate, 1,4-butylene glycol dimethacrylate, 1,2-ethylene glycol dimethacrylate, 1,6-hexanediol diacrylate, and divinyl benzene. In one embodiment, the acrylic emulsion polymer, e.g. homopolymer or copolymer, can be prepared, for example, by charging, at once or gradually, the monomeric ingredients, water and a surfactant (when employed) into a reaction vessel, purging the vessel with an inert gas, such as, for example, nitrogen and heating the vessel to a reaction temperature in the range of from 50 to 100° C. When the reaction vessel reaches the desired reaction temperature, one or more initiators are added to the reaction vessel. The reaction is continued for a period of time sufficient to complete the polymerization process, for example, a period in the range of from 1 to 4 hours. Upon near completion or the completion of the reaction, the reactor vessel and reaction content contained therein are cooled. This synthesis yields an aqueous polymeric composition comprising the polymer, e.g. homopolymer or copolymer, in water. In some instances, the composition has the appearance of a milky emulsion, while in other instances it looks like a clear or hazy solution.

The process for production of the copolymer may include the use of a seed which may be a (meth)acrylate, polystyrene or other seed useful to control the particle size of the emulsion. As is well known in the art, the regulation of initial seed can be used to control the ultimate range of particle sizes in the copolymer produced.

As used herein, the term "(meth)acrylate" means acrylate, methacrylate, and mixtures thereof and the term "(meth)acrylic" used herein means acrylic, methacrylic, and mixtures thereof.

Suitable mono-ethylenically unsaturated monomers may include nonionic monomers such as, for example, (meth) acrylic ester monomers including, for example, C1 to C30 (cyclo)alkyl (meth)acrylates, such as, for example methyl (meth)acrylate, ethyl methacrylate, butyl (meth)acrylate, 2-ethylhexyl (meth)acrylate, decyl acrylate, lauryl (meth) acrylate, isodecyl (meth)acrylate; (meth)acrylamide, substituted (meth)acrylamides, such as N-alkyl (meth)acrylamides and N,N-dialkyl (meth)acrylamides; ethylene; propylene; styrene and substituted styrenes; butadiene; vinyl esters, such as vinyl acetate and vinyl butyrate; vinyl chloride, vinyl toluene, and vinyl benzophenone; (meth)acrylonitrile; and vinylidene halides, such as, vinylidene chloride. Suitable ionic and hydrophilic mono-ethylenically unsaturated monomers may include, for example, hydroxyalkyl (meth) acrylates; glycidyl (meth)acrylate; mono-ethylenically unsaturated acid monomers; acetoacetoxyethyl (meth)acrylate, acetoacetoxyalkyl (meth)acrylates; amine-group containing monomers, such as vinyl imidazole, 2-(3-oxazolidinyl)ethyl (meth)acrylate and amine-functional (meth) acrylates, such as tert-butylaminoethyl (meth)acrylate, N,N-dimethylaminoethyl (meth)acrylate and N,N-dimethylaminopropyl (meth)acrylate; N-vinyl pyrrolidone; sodium vinyl sulfonate; phosphoethyl (meth)acrylate; acrylamido propane sulfonate; diacetone acrylamide; ethyleneureido-functional monomers; isocyanatoalkyl (meth)acrylate, and allyl acetoacetate.

Anionic, nonionic, and amphoteric surface active agents, that is, surfactants, can be employed in the copolymer synthesis process.

The acrylic emulsion may be polymerized via free radical polymerization, including, for example, thermal, redox (using redox catalysts), photochemical, and electrochemical initiation. Suitable free radical initiators or oxidants may include, for example, persulfates, such as, for example, ammonium and/or alkali metal persulfates; peroxides, such as, for example, sodium or potassium hydroperoxide, t-alkyl peroxides, t-alkyl hydroperoxides, dicumyl hydroperoxide; or t-alkyl peresters, wherein the t-alkylgroup includes at least 5 carbon atoms; perboric acids and their salts, such as, for example, sodium perborate; perphosphoric acids and salts thereof; potassium permanganate; and ammonium or alkali metal salts of peroxydisulfuric acid. Such initiators may be used in amounts ranging from 0.01 to 3.0 weight percent, based on the total weight of monomers.

Suitable redox catalysts comprise one or more oxidant with a suitable reductant. Suitable reductants may include, for example, sodium sulfoxylate formaldehyde; (iso)ascorbic acid; alkali metal and ammonium salts of sulfur-containing acids, such as sodium (bi)sulfite, thiosulfate, hydrosulfite, (hydro)sulfide or dithionite; formadinesulfinic acid; hydroxymethanesulfonic acid; sodium 2-hydroxy-2-sulfinatoacetic acid; acetone bisulfate; amines, such as ethanolamine, glycolic acid; glyoxylic acid hydrate; lactic acid; glyceric acid, malic acid; tartaric acid; and salts of thereof may be used in amounts of from 0.01 to 5.0 weight percent based on the total weight of monomers.

Redox reaction catalyzing metal salts of iron, copper, manganese, silver, platinum, vanadium, nickel, chromium, palladium, or cobalt may be added for the formation of such polymers. Typical levels of catalytic metal salts used is in the range of from 0.01 ppm to 25 ppm, and may range up to 1.0 wt. %, based on the total weight of monomers. Mixtures of two or more catalytic metal salts may also be usefully employed. Chelating ligands, which can be used with catalytic metal salts, include multidentate aminocarboxylate ligands, such as, for example, nitrilotriacetic acid (NTA, a tetradentate ligand), ethylene diamine diacetic acid (EDDA, a tetradentate ligand), N-(hydroxyethyl) ethylene diamine triacetic acid (HEDTA, a pentadentate ligand), and ethylene diamine tetraacetic acid (EDTA, a hexadentate ligand).

Any monomer in any polymerization may be added neat, i.e., not as an emulsion in water, or as an emulsion in water. The monomer may be added in one or more additions or continuously, linearly or not, over the reaction period, or combinations thereof. Suitable surfactants include cationic, anionic, and non-ionic surfactants. Anionically stabilized emulsion polymers may be stabilized by anionic surfactant or a mixture thereof with one on more nonionic surfactant. Conventional surfactants may be used to stabilize the emulsion polymerization systems before, during, and after polymerization of monomers. These conventional surfactants will usually be present at levels of 0.1 percent to 6 percent by weight based on the total weight of monomer in polymerization. At least one anionic, nonionic, or amphoteric surfactant may be used, or mixtures thereof. Examples of anionic emulsifiers include sodium lauryl sulfate, sodium dodecyl benzene sulfonate, dioctylsulfosuccinate, sodium polyoxyethylene lauryl ether sulfate, sodium dodecyl diphenyloxide disulfonate and other diphenylsulfonate derivatives, and sodium salt of tert-octylphenoxyethoxypoly(39) ethoxyethyl sulfate. Surfactants in the free acid form and in the salt form with other counterions may also be used, for example dodecylbenzene sulfonic acid and dodecylbenzene sulfonic acid ammonium salt.

In one embodiment, the acrylic emulsion can be a single stage or multistage polymer. The polymerization techniques used for preparing the multistage acrylic polymer present in the acrylic emulsion, also referred to as hard-soft polymer particles with one component having a lower Tg (soft) relative to the other component having a higher Tg (hard), where one component is polymerized in the presence of the other are well known in the art. The hard-soft polymer particles are typically prepared by a multistage aqueous emulsion polymerization process, in which at least two stages differing in composition are polymerized in a sequential fashion. Multi-stage polymerization techniques suitable for preparing the hard-soft polymer particles are disclosed, for example, in U.S. Pat. Nos. 4,325,856, 4,654,397, and 4,814,373. In the multistage polymerization process to prepare the hard-soft polymer, either the soft polymer or the hard polymer is prepared as a dispersion of the first polymer particle in water, followed by the polymerization of the other polymer (the hard polymer or the soft polymer, respectively) in the presence of the first polymer particles to provide the hard-soft particles.

The acrylic emulsion could also be a blend of two or more acrylic emulsions with same or different Tgs.

As used herein, unless otherwise indicated, the term "average particle size," (for acrylic emulsion) with regard to the acrylic emulsion and components thereof, means the particle size as determined by light scattering (LS) using a BI-90 particle size analyzer, Brookhaven Instruments Corp. (Holtsville, N.Y.).

As used herein, unless otherwise indicated, the phrase "molecular weight" (for acrylic emulsions) refers to the weight average molecular weight as measured by gel permeation chromatography (GPC) against a polymethylmethacrylate (PMMA) or polystyrene (PS) standard.

As used herein, unless otherwise indicated, the term "Tg" or "glass transition temperature" of a polymer, with regard to the acrylic emulsion and components thereof, refers to the Tg of a polymer calculated by using the Fox equation (T. G. Fox, Bull. Am. Physics Soc., Volume 1, Issue No. 3, page 123 (1956), i.e.

$$\frac{1}{Tg} = \frac{W_1}{Tg_{(1)}} + \frac{W_2}{Tg_{(2)}}$$

For a copolymer, W1 and W2 refer to the weight fraction of the two co-monomers and $Tg_{(1)}$ and $Tg_{(2)}$ refer to the glass transition temperature of the two corresponding homopolymers. The Tg of various homopolymers may be found, for example, in Polymer Handbook, edited by J. Brandrup and E. H. Immergut, Interscience Publishers. The "Experimental Tg" of a polymer, with regard to the acrylic emulsion and components thereof, is measured by differential scanning calorimetry (DSC) using the mid-point in the heat flow versus temperature transition as the Tg value. A typical heating rate for the DSC measurement is 20° C./minute.

The Polyolefin Emulsion Component

The polyolefin emulsion component of the present disclosure is prepared by emulsifying a polycarboxylic-compound functionalized polyolefin starting material.

Suitable polyolefin starting materials include, for example, thermally degraded homopolymers and copolymers of ethylene, propylene, 1-butene, 4-methyl-1-pentene, 3-methyl-1-butene, 4,4-dimethyl-1-pentene, 3-methyl-1-pentene, 4-methyl-1-hexene, 5-ethyl-1-hexene, 6-methyl-1-heptene, 1-hexene, 1-heptene, 1-octene, 1-nonene, 1-decene, and the like. These homopolymeric or copolymeric crystallizable poly-alpha-olefins are prepared by conventional polymerization processes for preparing polymeric materials. In some embodiments, the polyolefin starting material is a polypropylene or a copolymer of propylene and ethylene wherein the concentration by weight of ethylene is less than about 10%, for example less than about 2%. The polyolefin starting material of the present disclosure is commercially available, for example, through AlliedSignal (Morristown, N.J.) under the name ACX1089.

In some embodiments, the polyolefin starting material has the following physical properties: Mw about 7,500; Mz about 11,200; Mn about 3,000; and Gardner color of below 1.

The polyolefin starting material is functionalized with a moiety that enables the polyolefin starting material to be emulsified. In some embodiments, the functional group ("the moiety") for this purpose is derived from an ethylenically unsaturated polycarboxylic compounds such as unsaturated polycarboxylic acids, anhydrides and esters thereof. Suitable ethylenically unsaturated polycarboxylic compounds include, for example, maleic acid, maleic anhydride, fumaric acid, citraconic anhydride, aconitic anhydride, itaconic anhydride, dimethyl maleate, dimethyl fumarate, methyl ethyl maleate, dibutyl maleate, dipropyl maleate, and the like, as well as those compounds, such as, for example, citric acid, which form these compounds at reaction temperatures. In yet another embodiment, the functional group is derived from maleic anhydride. Maleic anhydride is commercially available, for example, though Monsanto Company (St. Louis, Mo.) as Maleic Anhydride, and Huntsman Petrochemical Corporation (Chesterfield, Mo.) as Manbri Maleic Anhydride.

The amount of ethylenically unsaturated polycarboxylic compound used in functionalizing the polyolefin starting material can vary from about 0.1 to about 45 wt % of the polyolefin starting material, for example from about 5 to 30 wt %, from 8 to 20 wt %, and in an alternative about 10 wt %. Amounts of polycarboxylic compound much over 10 wt % tend to cause the color of the resulting functionalized polyolefin to be dark, whereas lower amounts tend to not adequately react with the polypropylene to provide a clear emulsion or tend to react very slowly.

In addition to monitoring the amount of polycarboxylic compound added to the reaction, it is important to monitor the concentration of unreacted polycarboxylic compound in the reaction. That is, in concentration, the polycarboxylic compound, e.g. maleic anhydride, tends to undergo undesirable homopolymerization polymerization. The polymerization product is highly objectionable since it has a dark color, and tends to become dispersed in the functionalized polyolefin.

Accordingly, the process of the present disclosure minimizes the concentration of polycarboxylic compound through several approaches. First, it has been found that the polycarboxylic compound should be added slowly to a much larger mass of polyolefin starting material. The larger mass of starting material is believed to serve as a diluent to the unreacted polycarboxylic compound, minimizing its concentration, and thereby minimizing its polymerization. Additionally, it has been found that superior results are achieved when the polycarboxylic compound is fed slowly to the reaction. It is generally preferred to feed the polycarboxylic compound as slowly as economically practical. For example, in a batch reaction, the feed rate is about 1 to about 5 wt % of starting material per hour, for example from about 2 to about 4 wt % of starting material per hour, and in an alternative about 3 wt % of starting material per hour. Yet another approach to minimizing concentration of unreacted polycarboxylic compound is to ensure that there are no concentrated "pockets" of unreacted polycarboxylic compound in the reaction mass. As used herein, the "reaction mass" refers to the totality of the materials in the reactor including unreacted starting material, unreacted polycarboxylic compounds, initiators, catalysts, reagents, diluents, product and by-products. To ensure a homogeneous reaction mass, it is important that the reaction mass be mixed uniformly in an agitated reactor. In some embodiments, an impeller-type agitator is used.

The duration of the reaction is dependent upon the feed rate and the desired degree of functionalization. Generally, longer reaction times are preferred to minimize feed concentrations of polycarboxylic compound as discussed above. Reaction times, however, are constrained in length by economic/productivity considerations. It has been found that adequate product/productivity is achieved with a reaction period of about 0.5 to about 10 hours, for example from about 1 to about 5 hours, and in an alternative from about 2 to about 4 hours.

Functionalization according to the present disclosure is conducted at a temperature above the melting point of the starting material but no greater than about 200° C. The temperature is dependent upon the type of polyolefin and class of free radical initiators. At temperatures much below about 150° C., the starting material will not be in the molten form and therefore will not adequately react with the polycarboxylic compound. However, at temperatures above about 200° C., the ease of emulsification and melt viscosity of the resulting emulsifiable polyolefin is not as high as preferred. Therefore, reaction temperature is generally between about 150 and about 200° C., for example between about 180 and about 190° C. At the aforesaid temperatures, the polycarboxylic compound is a gas or liquid with little solubility in the starting material.

The reaction pressure depends, among other things, upon the reaction temperature and desired rate of reaction. Generally, the reaction is conducted under a pressures from about 5 to about 100 psi, for example from about 2 to about 25 psi, and in an alternative at around atmospheric. Reactions conducted at or around atmospheric pressure avoid expensive high pressure equipment.

During functionalization, it may be preferable to enhance free radical formation. Enhancing free radical formation is known in the art and includes, for example, heating the reaction, or, preferably, employing a free radical source. Suitable free radical sources include, for example, dialkyl peroxides, tertiary butyl hydroperoxide, cumene hydroperoxide, p-menthane peroxide, p-menthane hydroperoxide or axo compounds, such as azobis (isobutyronitrile), or irradiation sources. Suitable irradiation sources include, for example, those from cobalt, uranium, thorium sources, and the like and ultraviolet light. In some embodiments, the free radical sources are the peroxides with the butyl peroxides being more preferred. In some embodiments, the peroxide, due to availability and suitable good results obtained thereby, is ditertiary butyl peroxide (di-t-butyl peroxide). These compounds are commercially available through, for example, Elf Atochem as LUPERSOL™ 101 or Di-t-Butyl Peroxide, and Akzo Nobel Chemicals Inc. as TRIGONOX™ B.

The amount of peroxide or free radical agent used is generally quite low, being of the order of about 0.01 to about 5 wt % based on the weight of the polyolefin starting material, for example from about 0.1 to about 3 wt %, and in an alternative from about 0.75 to about 1.25 wt %. Amounts much above 5 wt % are not needed for good properties whereas amounts below about 0.01 wt % provide reactions that are too slow and incomplete.

In some embodiments, the free radical initiator, like the polycarboxylic compound feed, is added to the reaction mass slowly. In some embodiments, the free radical initiator is added to the reaction at a rate of about 0.01 to about 3 wt % of the starting material per hour, for example from about 0.1 to about 1 wt % of the starting material per hour, and in an alternative at about 0.3 wt % of the starting material per hour.

The functionalization process can be conducted either in a batchwise or continuous manner, however, batchwise reactions are generally preferred due to reproducibility and product quality.

Once a desired level of functionalization has been achieved, the unreacted polycarboxylic compound can be separated from the reaction mixture by purging the reaction mixture with an inert gas, such as nitrogen, while the reaction mixture is at the reaction temperature. After the unreacted polycarboxylic compound has been removed, the functionalized polypropylene can be further purified by a vacuum stripping or solvent extraction.

Suitable examples of the commercial available polycarboxylic-compound functionalized polyolefin starting material include, for example, A-C™ 597P (maleic anhydride modified polypropylene dispersion), and A-C™ 950P (maleic anhydride modified polypropylene dispersion) from Honeywell.

The emulsifiable polyolefin produced according to the present disclosure are more readily formed into emulsions than traditional ones. More specifically, it has been found that the emulsifiable polyolefin can be emulsified at lower temperatures than conventional used. The emulsion temperature is between about 140 and about 190° C., for example between 150 and about 175° C., and in an alternative between about 160 to about 170° C.

Although the polyolefin emulsion may be prepared at acidic, neutral or basic pH, it is preferred that the pH be between about 7 and about 12, for example between about 8 and about 11, and in an alternative between about 9 and about 10.

The polyolefin emulsions prepared according to the present disclosure generally contain about 10 to about 50 wt % emulsifiable polyolefin, for example from about 20 to about 40 wt %, and in an alternative from about 30 to about 35 wt %.

The amount of surfactant, used in the polyolefin emulsions of the present disclosure can be as high as about 20 wt %, for example between about 5 and about 15 wt %, and in an alternative between about 8 to about 12 wt %. Amounts much over about 15 wt % are generally not needed, however, minor amounts below about 3 wt % tend to be inadequate. Examples of suitable surfactants include Ingepal's CO series such as Ingepal CO-630, and Ingepal CO-710; nonylphenyl and ethoxylated alcohols such as Tergitol 15-S-9 and Tergitol 15-S-12.

The amount of water in the polyolefin emulsion generally varies depending upon the desired concentration of the emulsion, but is generally between about 40 and about 80 wt %, for example between about 50 and about 70 wt %, and in an alternative between about 60 to about 65 wt %, based on the total weight of the polyolefin emulsion.

Preferably, a base is generally added to the emulsion to render the aqueous solution basic, and is typically selected from standard bases such as tertiary amines and potassium hydroxide. Amounts of base may range up to about 10 wt %, for example from about 1 to 8 wt %, from about 2 to about 6 wt %, and in an alternative from about 3 to about 4 wt %.

The polyolefin emulsion can also contain other ingredients such as bleaching agents or whitening agents such as sodium metabisulfite. Although the bleaching agent or whitening agent is generally not needed, minor amounts often do decrease the color. The concentration of the bleaching agent may be as high as about 1 wt %, for example from about 0.1 to about 0.5 wt %, and in an alternative from about 0.2 to about 0.4 wt %.

Forming the Blend Composition of the Acrylic Emulsion Component and the Polyolefin Emulsion The acrylic emulsion component and the polyolefin emulsion component prepared by emulsifying a polycarboxylic-compound functionalized polyolefin starting material are blended together via various means, for example, mixers such as static mixers, also known as in-line mixers, or an agitated tank to form the aqueous based blend composition, the curable composition.

The curable aqueous composition of the present invention is preferably a formaldehyde-free curable composition. By "formaldehyde-free composition" herein is meant that the composition is substantially free from formaldehyde, nor does it liberate substantial formaldehyde as a result of drying and/or curing. In order to minimize the formaldehyde content of the curable composition it is preferred, when preparing the emulsion polymer of the present invention, to use polymerization adjuncts such as, for example, initiators, reducing agents, chain transfer agents, biocides, surfactants, and the like, which are themselves free from formaldehyde, do not generate formaldehyde during the polymerization process, and do not generate or emit formaldehyde during the treatment of a substrate. When low levels of formaldehyde are acceptable in the waterborne composition or when compelling reasons exist for using adjuncts which generate or emit formaldehyde, such compositions can be used.

The curable aqueous composition may contain, in addition, conventional treatment components such as, for example, emulsifiers, pigments, fillers or extenders, anti-migration aids, curing agents, coalescents, surfactants, biocides, plasticizers, organosilanes, anti-foaming agents, corrosion inhibitors, colorants, waxes, other polymers not of the present invention, and anti-oxidants.

In one aspect of the present invention a method for forming a treated substrate is provided including a) forming the curable aqueous composition of the present invention; b) contacting a flexible substrate with the curable aqueous composition; and c) heating the curable aqueous composition at a temperature of from 120 to 220° C. The flexible substrate includes paper; leather; woven or nonwoven fabrics; felts and mats or other assemblies of fibers, and fibers. Substrates including fibers may include cotton, synthetic fibers such as, for example, polyester and rayon, glass, mixtures thereof, and the like. The flexible substrate is contacted with the curable aqueous composition using conventional application techniques such as, for example, air or airless spraying, padding, saturating, roll coating, curtain coating, printing, and the like. Heating the curable aqueous composition at a temperature of from 120 to 220° C., preferably from 150 to 180° C., for a time sufficient to achieve an acceptable level of cure such as, for example, for a time of from 1 minute to 20 minutes, preferably from 2 minutes to 10 minutes is effected. The drying and curing functions can be effected in two or more distinct steps, if desired. For example, the composition can be first heated at a temperature and for a time sufficient to substantially dry but not to substantially cure the composition and then heated for a second time at a higher temperature and/or for a longer period of time to effect curing. Such a procedure, referred to as "B-staging", can be used to provide binder-treated nonwoven, for example, in roll form, which can at a later stage be cured, with or without forming or molding into a particular configuration, concurrent with the curing process.

EXAMPLES

I. Raw Material

Abbreviations used: DI water=deionized water; CD=Cross-machine direction; SC=Solids content; BA=Butyl acrylate; Sty=Styrene; IA=Itaconic acid; AA=Acrylic acid;

597P is polyolefin emulsion with SC of 39%, made from A-C™ 597P, a maleic anhydride modified polypropylene from Honeywell, with acid value of 63 mg KOH/g;

950P is polyolefin emulsion with SC of 39%, made from A-C™ 950P, a maleic anhydride modified polypropylene from Honeywell, with acid value of 33 mg KOH/g;

COHESA™ 3050 Emulsion is an ethylene-acrylic acid copolymer (EAA) dispersion from Honeywell, with SC of 40%, and the acid value of 50 mg KOH/g;

Acrylic emulsion example 1 is a polymer comprising, as polymerized units, 67.5% Sty, 27.5% BA, 3% AA, and 2% IA, with SC of 45%;

TRITON™ X-100 is a surfactant from Dow chemical company; WHATMAN™ qualitative filter paper No. 4 is a product of GE Healthcare brand.

II. Test Method

Wet Tensile Strength Test

Raw materials were formulated with proper agitation for 15 mins to obtain a curable aqueous composition according to the formulation in Table 1.

A piece of WHATMAN™ qualitative filter paper No. 4 (28 cm×46 cm) was dipped into 300 mL formulated emulsion, the curable composition. The treated paper was padded by Mathis padder and then dried and cured at 150° C. for 3 minutes. The add-on of the curable composition on paper was controlled between 14 to 16%. The cured paper was cut into pieces of 1 inch×4 inch wherein the 4 inch direction is the cross-machine (CD) direction of the paper. The tensile strength of specimens was tested under the treatment of 30 minutes immersion in 0.1% TRITON™ X-100/water solution on an Instron 5943 tester. The wet strength reflects the resistance of binder to water. The data was recorded.

TABLE 1

Formulation of the curable compositions

| | | Polyolefin Emulsion | | | Acrylic Emulsion |
| --- | --- | --- | --- | --- | --- |
| | Water | 597 P | 950 P | COHESA™ 3050 | Acrylic example 1 |
| Illustrative Example 1 | 198 g | 5 g (4.36%) | — | — | 95 g (95.64%) |
| Illustrative Example 2 | 196 g | 10 g (8.72%) | — | — | 90 g (91.28%) |
| Illustrative Example 3 | 198 g | — | 5 g (4.36%) | — | 95 g (95.64%) |
| Illustrative Example 4 | 196 g | — | 10 g (8.72%) | — | 90 g (91.28%) |
| Illustrative Example 5 | 232.5 g | 20.4 g (15%) | — | — | 100 g (85%) |
| Illustrative Example 6 | 246.2 g | 28.8 g (20%) | — | — | 100 g (80%) |
| Illustrative Example 7 | 261.5 g | 38.5 g (25%) | — | — | 100 g (75%) |
| Comparative Example 1 | 200 g | — | — | — | 100 g (100%) |
| Comparative Example 2 | 542.8 g | 214.3 g (65%) | — | — | 100 g (35%) |
| Comparative Example 3 | 209.9 g | — | — | 5.9 g (5%) | 100 g (95%) |
| Comparative Example 4 | 246.9 g | — | — | 28.1 g (20%) | 100 g (80%) |

Note:
Dry weight percent of each component was listed in brackets.

III. Results

Wet strength data of each curable composition was recorded in Table 2.

TABLE 2

Test results

| | Wet strength (kgf/inch) |
| --- | --- |
| Illustrative Example 1 | 3.59 |
| Illustrative Example 2 | 4.24 |
| Illustrative Example 2 at 50° C. for 15 days | 4.17 |
| Illustrative Example 3 | 3.26 |
| Illustrative Example 4 | 3.83 |
| Illustrative Example 5 | 4.71 |
| Illustrative Example 6 | 4.82 |
| Illustrative Example 7 | 4.53 |
| Comparative Example 1 | 3.01 |
| Comparative Example 2 | 2.85 |
| Comparative Example 3 | 2.8 |
| Comparative Example 4 | 2.65 |

Illustrative Curable Composition Examples 1 to 7 comprising individually from 4.36% to 25% specially selected polyolefin, maleic anhydride modified polypropylene, compared to Comparative Curable Composition 1 comprising 0 polyolefin, showed improved wet strength, with a trend that the higher the use amount of such polyolefin, the better the wet strength.

Comparative Curable Composition Example 2 used overdose polyolefin, and its wet strength is not acceptable.

Comparative Curable Composition Examples 3 to 4 used different polyolefin, an ethylene-acrylic acid copolymer, and their wet strengths are both unacceptable.

Illustrative Curable Composition Example 2 was further being aged in a 50° C. oven for 15 days. Its wet strength data is very close to that its original (before being aged) data. The result indicated that the curable composition of the present disclosure has a good storage stability.

What is claimed is:

1. A curable composition comprising from 70 to 99% by dry weight based on total dry weight of the curable composition, an acrylic emulsion component, and from 1 to 30% by dry weight based on the total dry weight of the curable composition, a polyolefin emulsion component prepared by emulsifying a polycarboxylic-compound functionalized polyolefin starting material.

2. The curable composition according to claim 1 wherein the acrylic emulsion component comprises from 0.25 to 10% by weight based on the total weight of the acrylic monomers, copolymerized ethylenically unsaturated carboxylic acid monomer.

3. The curable composition according to claim 2 wherein the copolymerized ethylenically unsaturated carboxylic acid monomer is selected from the group consisting of acrylic acid, methacrylic acid, crotonic acid, itaconic acid, fumaric acid, maleic acid, monomethyl itaconate, monomethyl fumarate, monobutyl fumarate, and maleic anhydride.

4. The curable composition according to claim 1 wherein the polyolefin starting material is selected from the group consisting of thermally degraded homopolymers and copolymers of ethylene, propylene, 1-butene, 4-methyl-1-pentene, 3-methyl-1-butene, 4,4-dimethyl-1-pentene, 3-methyl-1-pentene, 4-methyl-1-hexene, 5-ethyl-1-hexene, 6-methyl-1-heptene, 1-hexene, 1-heptene, 1-octene, 1-nonene, and 1-decene.

5. The curable composition according to claim 4 wherein the polyolefin starting material is a polypropylene.

6. The curable composition according to claim 4 wherein the polyolefin starting material is a copolymer of propylene and ethylene wherein the concentration by weight of ethylene is less than 10%.

7. The curable composition according to claim 1 wherein the polycarboxylic compound is unsaturated polycarboxylic acids, anhydrides and esters thereof.

8. The curable composition according to claim 1 wherein the polycarboxylic compound is selected from the group consisting of maleic acid, maleic anhydride, fumaric acid, citraconic anhydride, aconitic anhydride, itaconic anhydride, dimethyl maleate, dimethyl fumarate, methyl ethyl maleate, dibutyl maleate, dipropyl maleate, and citric acid.

9. The curable composition of claim 8, wherein the ethylenically unsaturated polycarboxylic compound is maleic anhydride.

10. The curable composition according to claim 1, wherein the composition is formaldehyde-free.

* * * * *